(12) United States Patent
Jin et al.

(10) Patent No.: US 10,069,671 B2
(45) Date of Patent: Sep. 4, 2018

(54) METHOD AND APPARATUS FOR PROCESSING ABNORMALITY OF APPLICATION PROXY CLIENT

(71) Applicant: Huawei Device (Dongguan) Co., Ltd., Dongguan (CN)

(72) Inventors: Hui Jin, Beijing (CN); Lei Wang, Beijing (CN); Shunan Fan, Beijing (CN)

(73) Assignee: Huawei Device (Dongguan) Co., Ltd., Dongguan (CN)

( * ) Notice: Subject to any disclaimer, the term of this patent is extended or adjusted under 35 U.S.C. 154(b) by 595 days.

(21) Appl. No.: 14/569,082

(22) Filed: Dec. 12, 2014

(65) Prior Publication Data

US 2015/0100690 A1 Apr. 9, 2015

Related U.S. Application Data

(63) Continuation of application No. PCT/CN2013/077307, filed on Jun. 17, 2013.

(30) Foreign Application Priority Data

Jun. 15, 2012 (CN) .......................... 2012 1 0201580

(51) Int. Cl.
*G06F 15/16* (2006.01)
*H04L 12/24* (2006.01)
(Continued)

(52) U.S. Cl.
CPC .......... *H04L 41/06* (2013.01); *H04L 61/6068* (2013.01); *H04L 67/145* (2013.01);
(Continued)

(58) Field of Classification Search
CPC ... H04L 41/06; H04L 61/6068; H04L 67/145; H04L 67/2819; H04L 67/06;
(Continued)

(56) References Cited

U.S. PATENT DOCUMENTS

2003/0061333 A1* 3/2003 Dean ................... H04L 41/0253
709/223
2005/0228848 A1 10/2005 Thurston et al.
(Continued)

FOREIGN PATENT DOCUMENTS

| CN | 101662478 A | 3/2010 |
|---|---|---|
| CN | 102223257 A | 10/2011 |
| CN | 102395119 A | 3/2012 |

OTHER PUBLICATIONS

"China Mobile Always Online Infrastructure (AOI) General Technical Requirements." China Mobile Communications, Business Standards V 1.0.0, Sep. 2011, 37 pages.

*Primary Examiner* — David Lazaro
*Assistant Examiner* — Berhanu Shitayewoldetsadi
(74) *Attorney, Agent, or Firm* — Slater Matsil, LLP

(57) ABSTRACT

A processing method and apparatus for an application proxy client are provided. The method includes determining, on a terminal, that an application proxy client is uninstalled; and sending an uninstallation indication message from the terminal to a proxy server corresponding to the application proxy client, where the uninstallation indication message indicates that the application proxy client has been uninstalled from the terminal.

27 Claims, 10 Drawing Sheets

(51) Int. Cl.
    *H04W 4/50*         (2018.01)
    *H04W 76/25*      (2018.01)
    *H04W 4/00*         (2018.01)
    *H04W 4/20*         (2018.01)
    *H04L 29/12*       (2006.01)
    *H04L 29/08*       (2006.01)
    *H04W 76/04*      (2009.01)

(52) U.S. Cl.
    CPC ......... *H04L 67/2819* (2013.01); *H04W 4/001* (2013.01); *H04W 4/20* (2013.01); *H04W 4/50* (2018.02); *H04W 76/045* (2013.01); *H04W 76/25* (2018.02)

(58) Field of Classification Search
    CPC ...... H04L 67/306; H04L 67/32; H04W 4/001; H04W 4/20; H04W 76/045
    USPC ................................. 709/224, 225, 232, 235
    IPC .................................. H04L 12/24, 29/08, 29/12
    See application file for complete search history.

(56) References Cited

U.S. PATENT DOCUMENTS

| | | | |
|---|---|---|---|
| 2007/0124513 A1* | 5/2007 | Kikuchi | ..................... G06F 8/62 710/8 |
| 2007/0276947 A1* | 11/2007 | Panattu | ............... H04L 65/4061 709/227 |
| 2010/0216434 A1 | 8/2010 | Marcellino et al. | |
| 2011/0093844 A1 | 4/2011 | Yang et al. | |
| 2012/0124202 A1* | 5/2012 | Cooper | ............. G06F 17/30035 709/224 |
| 2013/0124618 A1 | 5/2013 | Zhong | |
| 2013/0265940 A1* | 10/2013 | Su | ....................... H04L 67/2861 370/328 |

* cited by examiner

METHOD AND APPARATUS FOR PROCESSING ABNORMALITY OF APPLICATION PROXY CLIENT

This application is a continuation of International Application No. PCT/CN2013/077307, filed on Jun. 17, 2013, which claims priority to Chinese Patent Application No. 201210201580.1, filed on Jun. 15, 2012, both of which are incorporated herein by reference in their entireties.

TECHNICAL FIELD

The present invention relates to a wireless communications system, and in particular, to a method and an apparatus for processing an abnormal condition that occurs to an application proxy client on a terminal.

BACKGROUND

With the development of communications technologies, more applications appear on a terminal device. For example, an application on a smartphone, especially on some application clients related to the mobile Internet, including Instant Messenger (IM), Email, social networking service (SNS), and the like, needs to communicate, in real time, with a server on a network side or an application client on another smartphone.

At present, a manner used to implement this type of real-time communication is based on a client/server (C/S) service operation mode of a fixed network and a personal computer (PC), this type of real-time communication is implemented in a manner in which the PC fixedly accesses the Internet. In an entire service deployment process, a mobile communications network between a smartphone and an application server is used as a connection channel, and transparency processing is performed on an application for the mobile network, so that the server does not perceive a difference between a mobile terminal and a fixed terminal.

A mobile terminal needs to always maintain an Internet Protocol (IP) connection, that is, being similar to a fixed network, the mobile terminal is always ready to receive and send a data packet. Meanwhile, in a process in which an application program runs on the mobile terminal, heartbeat signaling is sent between the terminal and a server at a smaller time interval, so as to ensure constant refreshing of information about a peer end. This mechanism is used to maintain a valid IP connection for a long period, so that all service data is sent over this IP connection.

When no data is sent over a Packet Data Protocol (PDP) connection of the mobile terminal for a period of time, the PDP connection is released; however, when data is to be sent, the PDP connection needs to be re-established. In this way, a large number of terminals continually perform processes of PDP connection establishment and release to send the foregoing heartbeat signaling, thereby resulting in a so-called signaling storm that seriously consumes wireless communications resources of a mobile communications network.

At present, the industry proposes a push (Push) solution to solve a signaling storm problem. By means of setting a specific proxy server on a network side, for example, an always online infrastructure (AOI) server or a Push server, and setting a specific application proxy client on a terminal, for example, AOI middleware or a Push client, an IP connection between an application client such as IM, Email, and SNS on the terminal and an associated application server is replaced with a maintenance connection between the application proxy client on the terminal and the proxy server on the network side and a maintenance connection between the proxy server and the application server, so that information communication between the application client and the associated application server is implemented by using the connection between the application proxy client and the proxy server. Therefore, the application client on the terminal and the associated application server do not need to constantly send heartbeat signaling to maintain the IP connection, which avoids continual establishment and release processes of a PDP connection of the terminal and eases a network burden.

Some abnormal conditions may occur to an application proxy client on a terminal in a using process, for example, a user may uninstall the application proxy client from a mobile phone, or a connection between the application proxy client and a proxy server fails to be established because the mobile phone is powered off for a long period or out of service. For ease of description, That AOI middleware is used as an application proxy client and an AOI server is used as an application server for description in the following. A person skilled in the art should understand that, specific implementation manners of the application proxy client and the application server are not limited to the AOI middleware and the AOI server.

At present, in the industry, a method for detecting an abnormal condition such as uninstalling the AOI middleware from a terminal is as follows.

The AOI server sends a wakeup short message to the terminal when detecting an abnormal connection of the terminal; the AOI server resends the wakeup short message to the terminal if the terminal is not connected to the AOI server after time T1; the AOI server has resent the wakeup short message to the terminal for N1 times but the terminal is not connected to the AOI server; the AOI server adjusts a status of the terminal as offline; and in this status, if a certain application server wants to push a service message to the terminal through the AOI server, the AOI server returns a push failure message to the application server, where a failure cause is that the terminal is offline; and, if the terminal is still not connected to the AOI server after time T2, the AOI server determines that the user may have uninstalled middleware, and adjusts the status as that the middleware has been uninstalled; and in this status, if a certain application server wants to push a service message to the terminal through the AOI server, the AOI server returns a push failure message to the application server, where a failure cause is that the middleware is uninstalled, and the application server does not attempt to push the service message to the user after receiving this type of failure cause.

In an existing procedure, the AOI server can determine, only according to a specific operation, whether the terminal has deleted the AOI middleware. As a result, the AOI server cannot learn an accessible status of the terminal, thereby affecting quality of service of the application server; in addition, in the existing procedure, the terminal cannot learn, for example, the following information: The AOI server has considered that the AOI middleware is deleted from the terminal, information about the terminal has been deleted from the AOI server, and which application server has considered that the AOI middleware is deleted from the terminal, and the like. Acquiring the foregoing information can further improve processing efficiency among the terminal, the AOI server, and the application server, save a network resource, and improve quality of service of a related application client on the terminal. Therefore, in this field, a method for processing an abnormality of AOI middleware needs to be further improved.

SUMMARY

Embodiments of the present invention provide an improved method for processing an abnormality of an application proxy client on a terminal side and a network side, so that processing efficiency among a terminal, an AOI server, and an application server can further be improved, a network resource can be saved, and quality of service that can be provided by an application client and an application server for a user can be improved.

According to one aspect, an embodiment of the present invention provides a processing method for an application proxy client, including: determining, on the terminal, that the application proxy client is uninstalled; and sending an uninstallation indication message from the terminal to a proxy server corresponding to the application proxy client, where the uninstallation indication message indicates that the application proxy client has been uninstalled from the terminal.

According to another aspect, an embodiment of the present invention provides a method for learning that an application proxy client has been uninstalled from a terminal, including: receiving, on a proxy server, an uninstallation indication message from the terminal, where the uninstallation indication message indicates that the application proxy client has been uninstalled from the terminal; and marking, according to the uninstallation indication message, a status of the terminal on the proxy server as that the application proxy client has been uninstalled from the terminal.

According to another aspect, an embodiment of the present invention provides a method for waking a terminal up, including: sending a wakeup message from a proxy server to the terminal; determining, on the proxy server, whether the terminal receives the wakeup message; when it is determined that the terminal does not receive the wakeup message, marking a status of the terminal as inaccessible on the proxy server; when it is determined that the terminal receives the wakeup message, determining, on the proxy server, whether an uninstallation indication message sent by the terminal is received, where the uninstallation indication message includes an indication indicating that the application proxy client has been uninstalled from the terminal; and when it is determined that the uninstallation indication message sent by the terminal is received, marking the status of the terminal on the proxy server as that the application proxy client has been uninstalled from the terminal.

According to another aspect, an embodiment of the present invention provides a method for waking a terminal up, including: receiving, on the terminal, a wakeup message from a proxy server, determining, on the terminal, whether the application proxy client has been uninstalled from the terminal; and if it is determined that the application proxy client has been uninstalled from the terminal, sending an uninstallation indication message from the terminal to the proxy server, where the message indicates that the application proxy client has been uninstalled from the terminal.

According to another aspect, an embodiment of the present invention provides a re-registration method for a terminal, including: receiving, on a proxy server, a registration request from the terminal; determining, according to an identifier (ID) of the terminal included in the registration request, whether information about the terminal is saved on the proxy server; if it is determined that the information about the terminal is saved on the proxy server, determining whether a status of the terminal has been marked on the proxy server as that an application proxy client has been uninstalled from the terminal; and if it is determined that the status of the terminal has been marked on the proxy server as that the application proxy client has been uninstalled from the terminal, sending a registration response from the proxy server to the terminal, where the registration response includes an uninstallation indication and an application server list, where the uninstallation indication is used to indicate that the status of the terminal has been marked on the proxy server as that the application proxy client has been uninstalled from the terminal, and an application server in the list is an application server that has been notified by the proxy server that the application proxy client has been uninstalled from the terminal.

According to another aspect, an embodiment of the present invention provides a re-registration method for a terminal, including: sending a registration request from the terminal to a proxy server; receiving, on the terminal, a registration response from the proxy server in response to the registration request, where the registration response includes an uninstallation indication and an application server list, where the uninstallation indication is used to indicate that a status of the terminal has been marked on the proxy server as that an application proxy client has been uninstalled from the terminal, and an application server in the list is an application server that has been notified by the proxy server that the application proxy client has been uninstalled from the terminal; and triggering, on the terminal, an application client associated with an application server in the list to register with the corresponding application server in the list.

According to another aspect, an embodiment of the present invention provides a processing apparatus for an application proxy client, including: a determining unit, configured to determine, on the terminal, that the application proxy client is uninstalled; and a sending unit, configured to send an uninstallation indication message from the terminal to a proxy server corresponding to the application proxy client, where the uninstallation message indicates that the application proxy client has been uninstalled from the terminal.

According to another aspect, an embodiment of the present invention provides an apparatus for learning that an application proxy client has been uninstalled from a terminal, including: a receiving unit, configured to receive, on a proxy server, an uninstallation indication message from the terminal, where the uninstallation indication message indicates that the application proxy client has been uninstalled from the terminal; and a marking unit, configured to mark, according to the uninstallation indication message, a status of the terminal on the proxy server as that the application proxy client has been uninstalled from the terminal.

According to another aspect, an embodiment of the present invention provides an apparatus for waking a terminal up, including: a sending unit, configured to send a wakeup message from a proxy server to the terminal; a judging unit, configured to determine, on the proxy server, whether the terminal receives the wakeup message; a marking unit, configured to: when it is determined that the terminal does not receive the wakeup message, mark a status of the terminal as inaccessible on the proxy server, where when it is determined that the terminal receives the wakeup message, the judging unit determines whether an uninstallation indication message sent by the terminal is received, where the uninstallation indication message includes an indication indicating that the application proxy client has been uninstalled from the terminal; and when it is determined that the uninstallation indication message sent by the terminal is received, the marking unit marks the status of the terminal on the proxy server as that the application proxy client has been uninstalled from the terminal.

According to another aspect, an embodiment of the present invention provides an apparatus for waking a terminal up, including: a receiving unit, configured to receive, on the terminal, a wakeup message from a proxy server; a judging unit, configured to determine, on the terminal, whether the application proxy client has been uninstalled from the terminal; and a sending unit, configured to: if it is determined that the application proxy client has been uninstalled from the terminal, send an uninstallation indication message from the terminal to the proxy server, where the message indicates that the application proxy client has been uninstalled from the terminal.

According to another aspect, an embodiment of the present invention provides a re-registration apparatus for a terminal, including: a receiving unit, configured to receive, on a proxy server, a registration request from the terminal; a judging unit, configured to determine, according to an identifier (ID) of the terminal included in the registration request, whether information about the terminal is saved on the proxy server; if it is determined that the information about the terminal is saved on the proxy server, determine whether a status of the terminal has been marked on the proxy server as that an application proxy client has been uninstalled from the terminal; and a sending unit, configured to: when the judging unit determines that the status of the terminal has been marked on the proxy server as that the application proxy client has been uninstalled from the terminal, send a registration response from the proxy server to the terminal, where the registration response includes an uninstallation indication and an application server list, where the uninstallation indication is used to indicate that the status of the terminal has been marked on the proxy server as that the application proxy client has been uninstalled from the terminal, and an application server in the list is an application server that has been notified by the proxy server that the application proxy client has been uninstalled from the terminal.

According to another aspect, an embodiment of the present invention provides a re-registration apparatus for a terminal, including: a registration unit, configured to send a registration request from the terminal to a proxy server; and a receiving unit, configured to receive, on the terminal, a registration response in response to the registration request from the proxy server, where the registration response includes an uninstallation indication and an application server list, where the uninstallation indication is used to indicate that a status of the terminal has been marked on the proxy server as that an application proxy client has been uninstalled from the terminal, and an application server in the list is an application server that has been notified by the proxy server that the application proxy client has been uninstalled from the terminal; and the registration unit is further configured to trigger, on the terminal, an application client associated with an application server in the list to register with the corresponding application server in the list.

According to another aspect, an embodiment of the present invention provides a wireless communications device, including: a memory, configured to store data and an instruction; and a processor coupled to the memory, configured to run according to the data and the instruction in the memory, so that the wireless communications device can implement the foregoing method according to the present invention.

According to another aspect, an embodiment of the present invention provides a machine-readable medium that stores an instruction. When a machine executes the instruction, the machine can implement the foregoing method according to the present invention.

According to another aspect, an embodiment of the present invention provides a computer program. The computer program is used to implement the foregoing method according to the present invention.

Other objectives and effects of the present invention become clearer and more comprehensible with a more comprehensive understanding of the embodiments of present invention and with reference to descriptions of the following accompanying drawings and content of the claims.

BRIEF DESCRIPTION OF THE DRAWINGS

The following describes the present invention in detail with reference to the accompanying drawings and embodiments, where.

In all the accompanying drawings, a same number indicates a similar or a corresponding feature or function.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

A person skilled in the art should understand that, in descriptions of the following specific embodiments, different terms indicate a same or a similar meaning, only for adapting to different expression manners that are used in different specific contexts. For example, "application", "application client", "application software", and "application program" that may be mentioned in the following embodiments indicate a same or a similar meaning, "application proxy client", "application proxy software", and "middleware" that may be mentioned in the following embodiments indicate a same or a similar meaning, and "registration", "login", "re-registration", and "re-login" that may be mentioned in the following embodiments indicate a same or a similar meaning.

A person skilled in the art should understand that, in descriptions of the following specific embodiments, for ease of description, that AOI middleware is used as an application proxy client and an AOI server is used as an application server is used as an example for description. A person skilled in the art should understand that, a specific implementation manner of the application proxy client and a proxy server is not limited to the AOI middleware and the AOI server, for example, the application proxy client may be AOI middleware or a Push client, and the proxy server may be an AOI server or a Push server. Regardless of a specific name, an implementation manner that complies with the present invention shall fall within the protection scope of the present invention.

Figure 1:
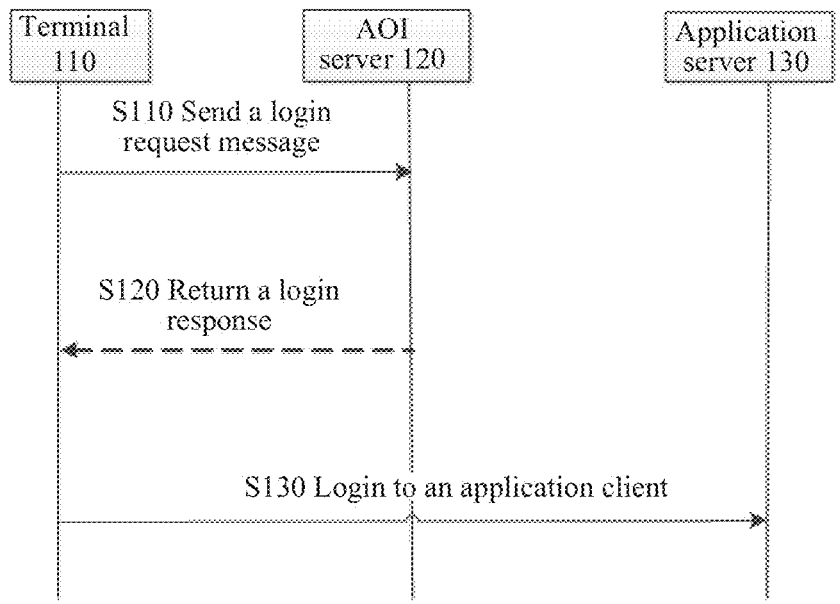
FIG. 1 is a schematic diagram of a re-activation procedure of AOI middleware in the prior art.

FIG. 1 shows a re-activation procedure of AOI middleware on a terminal in the prior art. The activation procedure is performed, for example, in the following scenario: A terminal has established a connection to an AOI server and middleware on the terminal is not uninstalled. For example, when the terminal is powered on or is online again after being powered off or having no signal for a period of time, the terminal or AOI middleware on the terminal sends a re-registration request to the AOI server.

As shown in FIG. 1, in step S110, a terminal 110 sends a registration request to an AOI server 120, where the request message carries application identifications (ID, identification) of all application clients, which are associated with an AOI client, on the terminal 110. Herein, the application client associated with the AOI client is an application client that implements communication with a corresponding application server 130 through the AOI client and the AOI server 120, for example, application software such as IM, Email, and SNS.

In step S120, the AOI server 120 changes a status of a user to normal and returns a response message to the terminal 110. In this step, if the terminal 110 has a new application, the AOI server 120 generates a token (token) for the new application and returns the newly-generated token in the response message to the terminal 110.

In step S130, all related application clients on the terminal 110 initiate a login request to an application server 130 that provides a service for the application clients, where a token allocated to each of the application clients by the AOI server is carried in the login request. The application server 130 changes the status of the user to normal. The application server 130 can learn, according to the token in the login request, that the application server 130 communicates with the terminal 110 through the AOI server 120, for example, the application server 130 sends a message to the AOI server 120 and the AOI server 120 sends the message to the corresponding terminal 110.

Figure 2:
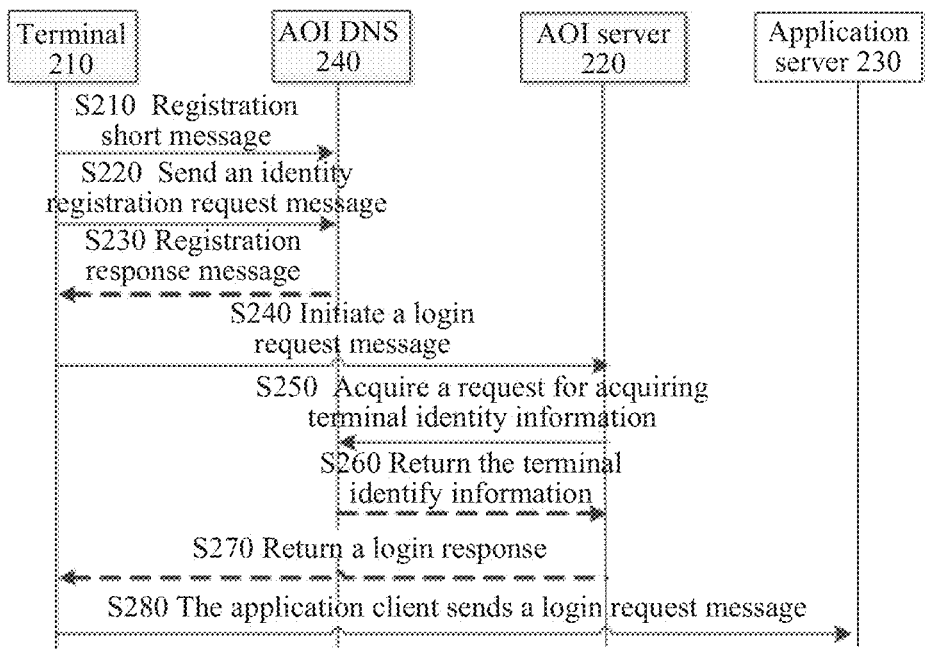
FIG. 2 is a schematic diagram of an initial activation procedure of AOI middleware in the prior art.

FIG. 2 shows an initial activation procedure of AOI middleware on a terminal in the prior art. This activation procedure is performed, for example, in the following scenario: AOI middleware is installed on a terminal for the first time, or AOI middleware is re-installed on a terminal after previously-installed AOI middleware is uninstalled. In this case, the terminal has no information about establishing a connection with an AOI server.

As shown in FIG. 2, in step S210, a terminal 210 sends a registration short message to an AOI domain name system (DNS) 240. The short message includes an international mobile subscriber identification number (IMSI) digest of a subscriber identity module (SIM) associated with the terminal 210. The IMSI digest, for example, is a part of an IMSI and is used to uniquely identify a user. The DNS records a mapping between the IMSI digest of the terminal and a mobile subscriber international ISDN/PSTN number (MSISDN).

In step S220, the terminal 210 sends a registration request to the AOI DNS 240. The request message includes the IMSI digest of the terminal 210.

In step S230, the AOI DNS 240 returns a registration response to the terminal 210. The response message carries AOI server address information of the terminal 210.

In step S240, the terminal 210 initiates a registration request to an AOI server 220. The request message includes the IMSI digest of the terminal 210 and an application ID of an application client with which the terminal needs to register.

In step S250, if the AOI server 220 finds that no terminal user information corresponding to the IMSI exists locally, the AOI server 220 sends a request message for acquiring terminal identity information to the AOI DNS 240. The message includes the IMSI digest of the terminal 210.

In step S260, the AOI DNS 240 returns a response message in response to the message for acquiring terminal identify information to the AOI server 220. The response message includes the IMSI digest of the terminal 210 and a corresponding MSISDN number.

In step S270, the AOI server 220 performs authentication on a user of the terminal 210 and generates a token for a related application on the terminal 210, and then returns a registration response to the terminal 210. The response message carries a token allocated to an application client on the terminal 210.

In step S280, all related application clients on the terminal 210 each initiate a login request to an application server 230 that provides a service for the application clients, where a token allocated to each of the application clients by the AOI server 220 is carried in the login request. The application server 230 changes a status of the user to normal and then sends information to the terminal through the AOI service 220.

Figure 3A:
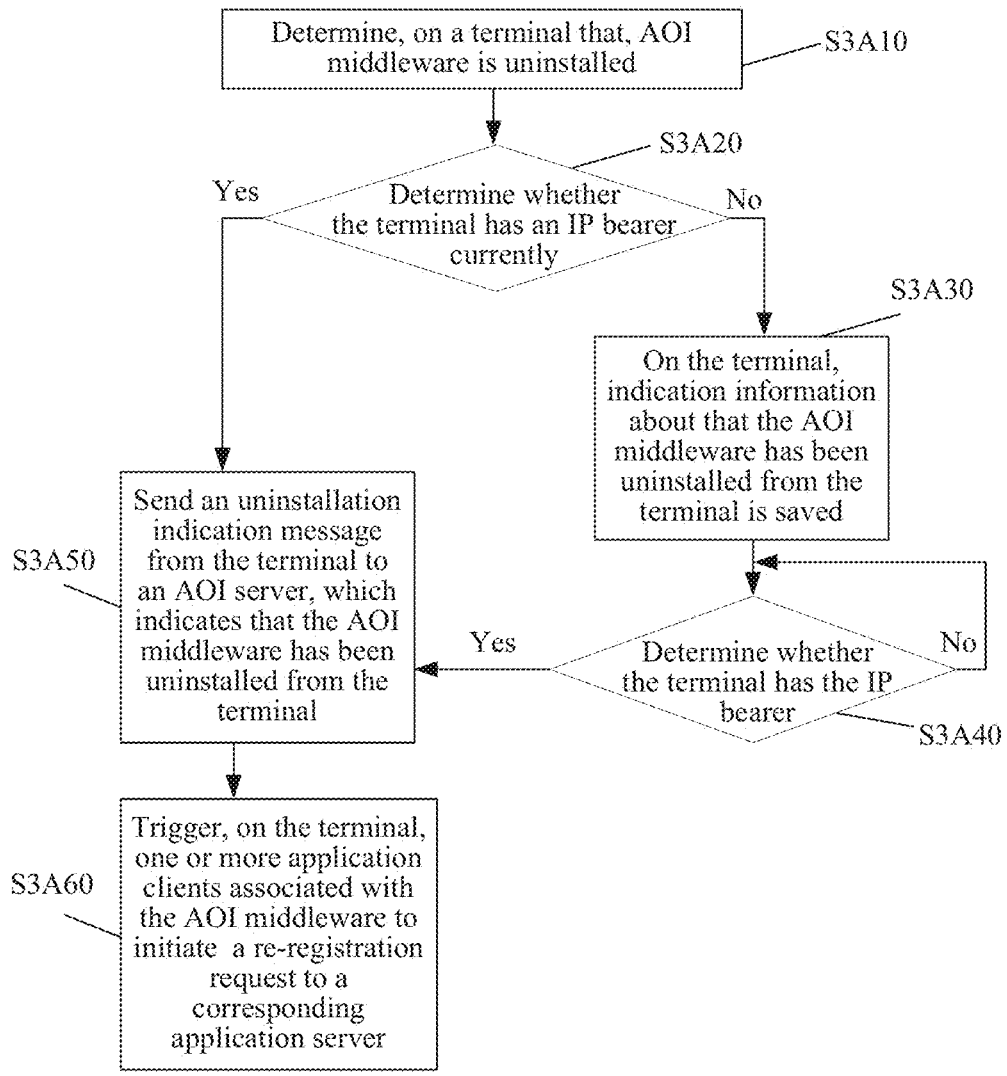
FIG. 3A to FIG. 3C are schematic diagrams of exemplary processing procedures for uninstalling AOI middleware from a terminal according to embodiments of the present invention.
Figure 3B:
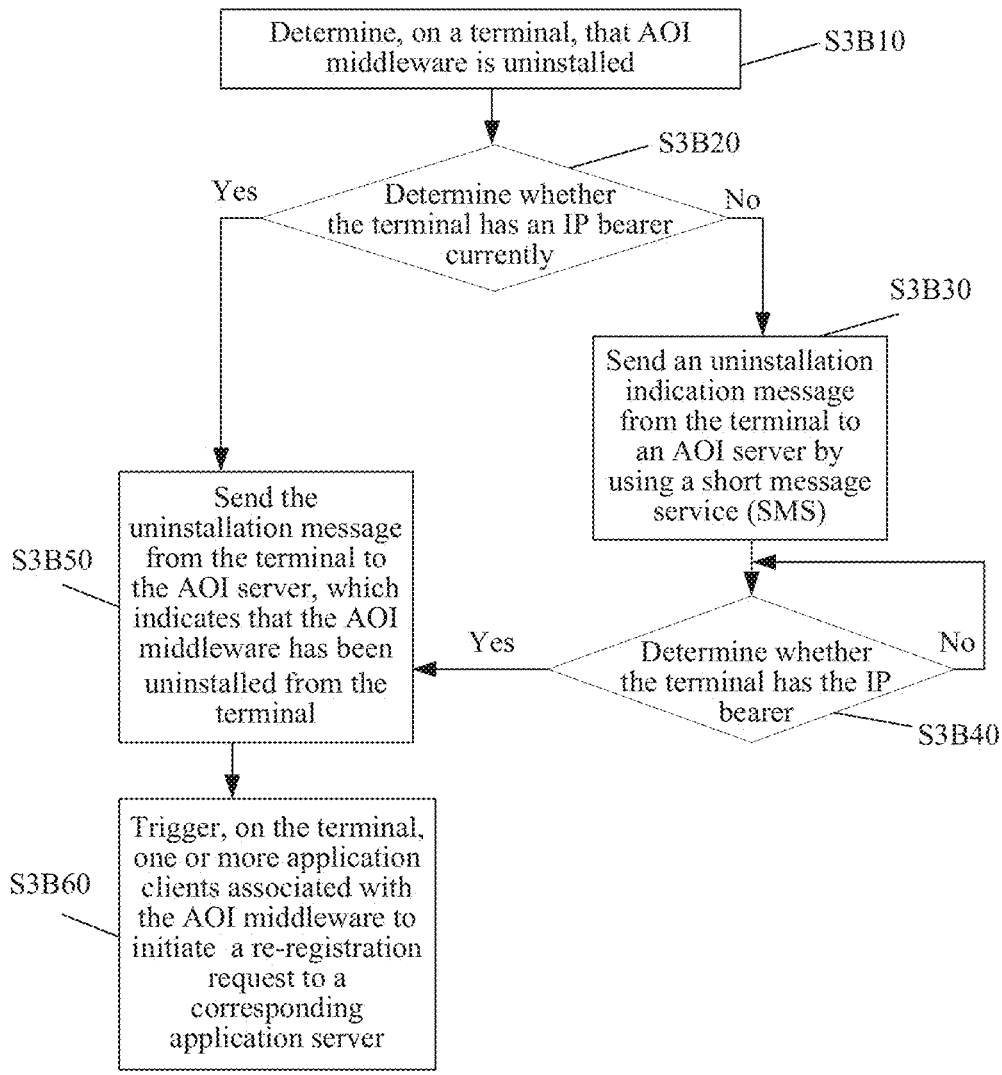
Figure 3C:
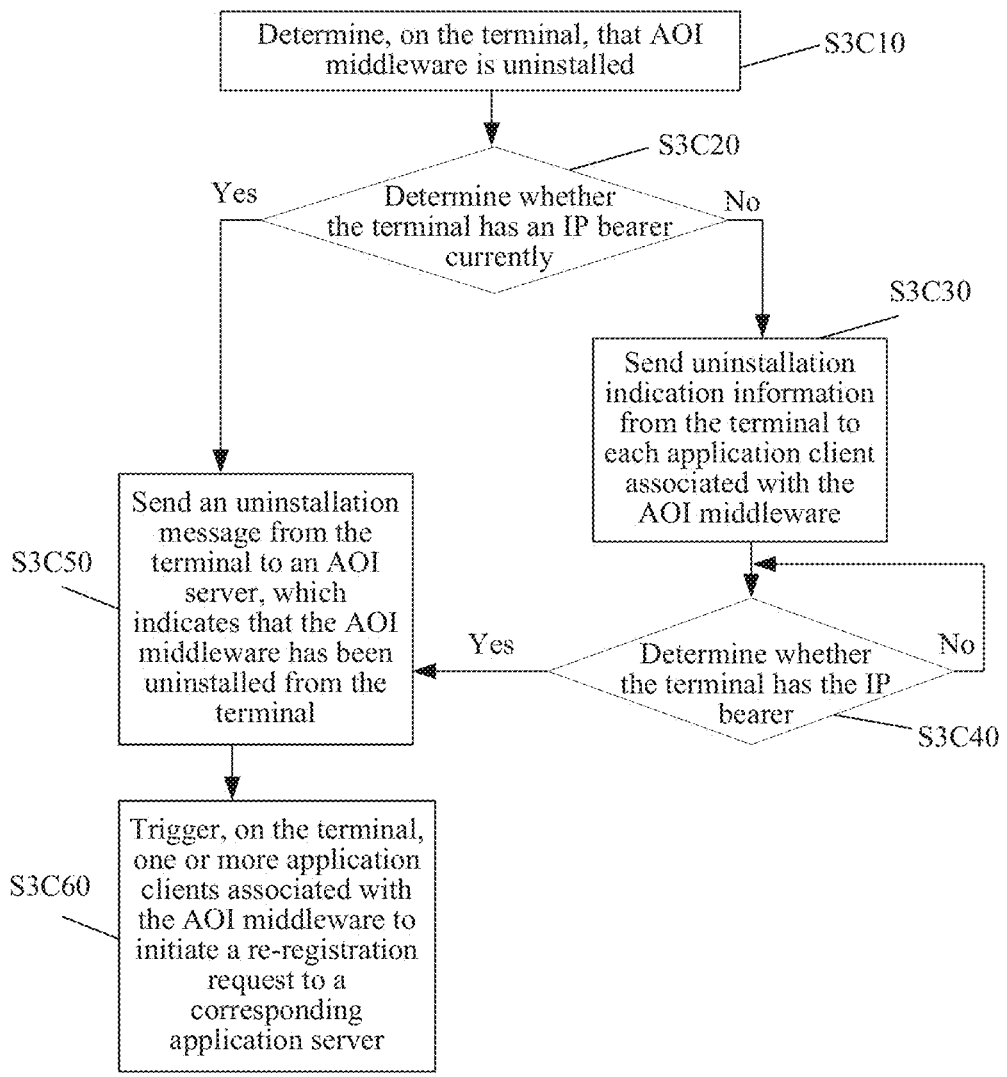

FIG. 3A to FIG. 3C are schematic diagrams of exemplary processing procedures for uninstalling AOI middleware from a terminal according to embodiments of the present invention.

FIG. 3A shows a method for uninstalling AOI middleware from a terminal according to an embodiment of the present invention. The terminal, for example, is the terminal 110 or 210 shown in FIG. 1 or FIG. 2. As shown in FIG. 3A, in step S3A10, on a terminal, it is determined that AOI middleware is uninstalled. An uninstallation operation on the AOI middleware, for example, may be performed according to an uninstallation instruction entered by a user on the terminal. For example, uninstallation of the AOI middleware may be determined by detecting an uninstallation instruction for the AOI middleware. For example, the uninstallation of the AOI middleware may be determined by monitoring a process that is of an operating system of the terminal and related to the uninstallation operation. A person skilled in the art should understand that, operating systems of terminals such as smartphones may be different, and accordingly, specific manners for determining uninstallation of AOI middleware may also be different. The scope of the present invention is not limited by various specific manners. For another example, whether the AOI middleware is uninstalled may be determined after the terminal receives a wakeup message from an AOI server. For example, after the wakeup message is received on the terminal, it may be determined whether the AOI middleware is installed on the terminal. When the AOI middleware is not installed on the terminal, it is determined that the AOI middleware has been uninstalled from the terminal.

In step 3A20, when the AOI middleware is uninstalled from the terminal, it is determined whether the terminal has an IP bearer available for a connection to the AOI server.

In step 3A20, if it is determined that the terminal has the IP bearer, step S3A50 is performed to send an uninstallation indication message from the terminal to the AOI server over the IP bearer, where the uninstallation indication message indicates that the AOI middleware has been uninstalled from the terminal. The uninstallation indication message may specifically be a notification (Notification) message, an indication (Indication) message, or the like. Herein, the uninstallation indication message does not specifically indicate a name of a message, but indicates that a function of the message is used to notify the AOI server that the AOI middleware has been uninstalled from the terminal.

In step S3A50, by means of actively notifying, by the terminal when the AOI middleware is uninstalled, the AOI server of a case in which the AOI middleware has been uninstalled from the terminal, the AOI server can timely learn an accessible status of the terminal, instead of determining, by itself only according to a specific operation of the AOI server on a network side according to an existing method, whether the middleware has been deleted from the terminal, thereby simplifying an operation on the network side and reducing resource consumption caused in a process in which the AOI server continually attempts to wake up the terminal from which the AOI middleware has been deleted. The AOI server accurately and timely learns a status that the AOI middleware has been uninstalled from the terminal, so that quality of service of an application server can further be improved timely. For example, when a certain application server sends data destined for the terminal to the AOI server, the AOI server can timely notify the application server that the AOI middleware has been uninstalled from the terminal, so that the application server no longer continually sends the data destined for the terminal to the AOI server.

In step 3A20, if it is determined that the terminal has no IP bearer currently, step S3A30 is performed. On the terminal, indication information about that the AOI middleware has been uninstalled from the terminal is saved (for example, temporarily saved) on the terminal. Then, step S3A40 is performed to determine whether the terminal has the IP bearer, for example, whether the terminal has the IP bearer may be regularly determined. When it is determined, in step S3A40, that the terminal has the IP bearer, step S3A50 is performed to send the uninstallation indication message from the terminal to the AOI server over the IP bearer.

In step S3A60, when the terminal has the IP bearer, one or more application clients associated with the AOI middleware are triggered on the terminal to initiate, over the IP bearer, a re-registration request or a registration request to one or more application servers that provide services for the one or more the application clients. Herein, without loss of generality, to distinguish expressions, the registration request initiated to the application server may be referred to as an application registration request. According to an embodiment, the re-registration request does not carry information about a Token allocated by the AOI server to the application client. Each application server can learn, according to that the re-registration request does not carry the Token, that each application server does not communicate with the terminal through the AOI server subsequently. In step S3A60, by means of triggering, when the AOI middleware is uninstalled, a related application client to perform a re-registration process or a registration process with a application server, a connection between the application client and the corresponding application server can be established timely, which improves user experience; and the application server can timely learn a case in which the AOI middleware has been uninstalled from the terminal, and information is no longer sent to the AOI server, which improves an operation on the network side.

FIG. 3B shows a method for uninstalling AOI middleware from a terminal according to another embodiment of the present invention. The terminal, for example, is the terminal 110 or 210 shown in FIG. 1 or FIG. 2. In this embodiment, steps S3B10, S3B20, S3B50, and S3B60 are the same as steps S3A10, S3A20, S3A50, and S3A60 shown in FIG. 3A, and are not further described herein.

As shown in FIG. 3B, in step S3B10, on a terminal, it is determined that AOI middleware is uninstalled.

In step 3B20, it is determined whether the terminal has an IP bearer when the AOI middleware is uninstalled from the terminal.

In step 3B20, if it is determined that the terminal has the IP bearer, step S3B50 is performed to send an uninstallation indication message from the terminal to an AOI server over the IP bearer, where the uninstallation indication message indicates that the AOI middleware has been uninstalled from the terminal. Then, step S3B50 to step S3B60 are performed. One or more application clients associated with the AOI middleware are triggered on the terminal to initiate a re-registration request or a registration request to corresponding one or more application servers over the IP bearer. The re-registration request does not carry information about a Token allocated by the AOI server to the application client.

In step 3B20, if it is determined that the terminal has no IP bearer currently, step S3B30 is performed to send an uninstallation indication message from the terminal to the AOI server by using a short message service (SMS). As an optional operation, when receiving the uninstallation indication message, the AOI server may send a notification message to each application server that provides a service for the terminal, where the notification message includes an indication indicating that the AOI middleware has been uninstalled from the terminal. By sending the uninstallation indication message to the AOI server by using the SMS in step S3B30, the terminal can timely notify the AOI server of the uninstallation situation in a case in which there is no IP bearer when the AOI middleware is uninstalled, so that the AOI server can learn an accessible status of the terminal more timely compared with the embodiment shown in FIG. 3A, thereby more effectively avoiding a situation that the AOI server determines, by itself according to a specific operation on the network side, whether the middleware has been deleted from the terminal. By means of the foregoing optional operation, when receiving the uninstallation indication message sent by the terminal by using the SMS, the AOI server notifies the uninstallation indication to the application server, so that the application server accurately and timely learns a status that the AOI middleware has been uninstalled from the terminal and no longer sends information to the AOI server, which improves the operation on the network side.

In step S3B40, it is determined whether the terminal has an IP bearer. When it is determined, in step S3B40, that the terminal has the IP bearer, step S3B60 is performed to trigger, on the terminal, each application client associated with the AOI middleware to initiate, over the IP bearer, a re-registration request or a registration request to each application server that provides a service for the application client. According to an embodiment, the re-registration request does not carry information about a Token allocated by the AOI server to the application client.

FIG. 3C shows a method for uninstalling AOI middleware from a terminal according to another embodiment of the present invention. The terminal, for example, is the terminal 110 or 210 shown in FIG. 1 or FIG. 2. Steps S3C10, S3C20, S3C50, and S3C60 in this embodiment are the same as steps S3A10, S3A20, S3A50, and S3A60 shown in FIG. 3A, and are not further described herein.

As shown in FIG. 3C, in step S3C10, on a terminal, it is determined that AOI middleware is uninstalled.

In step 3C20, it is determined whether the terminal has an IP bearer when the AOI middleware is uninstalled from the terminal.

In step 3C20, if it is determined that the terminal has the IP bearer, step S3C50 is performed to send an uninstallation indication message from the terminal to an AOI server over the IP bearer, where the uninstallation indication message indicates that the AOI middleware has been uninstalled from the terminal. Then, step S3C50 to step S3C60 are performed. One or more application clients associated with the AOI middleware are triggered on the terminal to initiate a re-registration request or a registration request to corresponding one or more application servers over the IP bearer. The re-registration request does not carry information about a Token allocated by the AOI server to the application client.

In step 3C20, if it is determined that the terminal has no IP bearer currently, step S3C30 is performed to send uninstallation indication information from the terminal to each application client associated with the AOI middleware, where the uninstallation indication information includes an indication indicating that the AOI middleware has been uninstalled from the terminal.

In step S3C40, it is determined whether the terminal has an IP bearer. When it is determined, in step S3B40, that the terminal has the IP bearer, step S3C60 is performed to trigger, on the terminal, each application client associated with the AOI middleware to initiate, over the IP bearer, a re-registration request or a registration request to each application server that provides a service for the application client. According to an embodiment, the re-registration request does not carry information about a Token allocated by the AOI server to the application client.

Figure 4A:
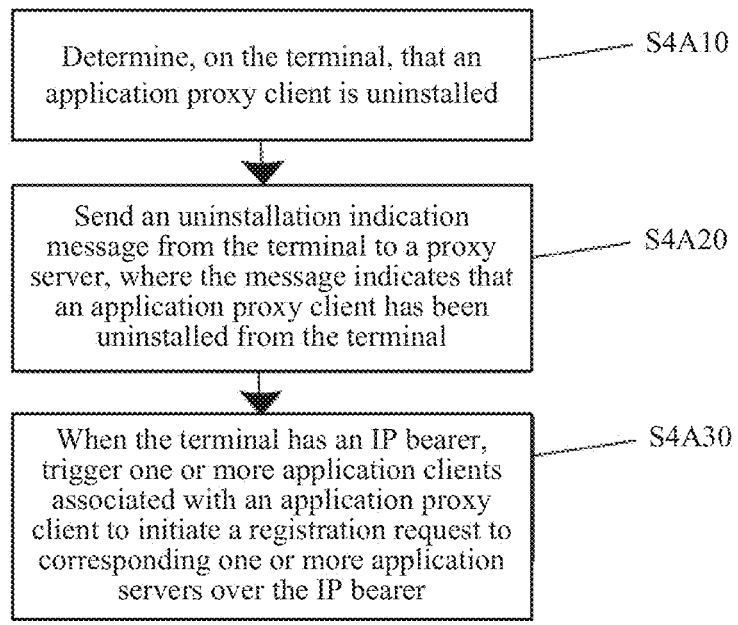
FIG. 4A is a schematic diagram of an exemplary processing procedure for uninstalling AOI middleware from a terminal according to an embodiment of the present invention.

FIG. 4A shows a method for uninstalling AOI middleware from a terminal according to an embodiment of the present invention. The terminal, for example, is the terminal 110 or 210 shown in FIG. 1 or FIG. 2.

As shown in FIG. 4A, in step S4A10, on a terminal, it is determined that an application proxy client is uninstalled. The application proxy client, for example, is the foregoing AOI middleware or a Push client. The uninstallation operation, for example, may be performed according to an uninstallation instruction entered by a user on the terminal.

In step S4A20, an uninstallation indication message is sent from the terminal to a proxy server corresponding to the application proxy client, where the message indicates that the application proxy client has been uninstalled from the terminal. In step S4A20, by means of actively notifying, by the terminal when the application proxy client is uninstalled, the proxy server of a case in which the application proxy client has been uninstalled from the terminal, the proxy server can learn an accessible status of the terminal timely, instead of determining, by itself only according to a specific operation of the proxy server on a network side according to an existing method, whether the application proxy client has been deleted from the terminal, thereby simplifying an operation on the network side and reducing resource consumption caused in a process in which the proxy server continually attempts to wake up the terminal from which the application proxy client has been deleted. The proxy server accurately and timely learns a status that the application proxy server has been uninstalled from the terminal, so that quality of service of an application server can further be improved timely. For example, when a certain application server sends data destined for the terminal to the proxy server, the proxy server can timely notify the application server that the application proxy client has been uninstalled from the terminal, so that the application server no longer continually sends the data destined for the terminal to the proxy server.

In step S4A30, when the terminal has an IP bearer, one or more application clients associated with the application proxy client are triggered to initiate a registration request or a re-registration request to corresponding one or more application servers over the IP bearer. According to an embodiment, the registration request does not carry information about a Token allocated by the proxy server to the application client. Each application server can learn, according to that the registration request does not carry the Token, that each application server does not communicate with the terminal through the proxy server subsequently. In step S4A30, by means of triggering, when the AOI middleware is uninstalled, a related application client to perform a registration process or a re-registration process with a application server, a connection between the application client and the corresponding application server can be established timely, which improves user experience; and the application server can timely learn a case in which the application proxy client has been uninstalled from the terminal, and information is no longer sent to the proxy server, which improves an operation on the network side.

Figure 4B:
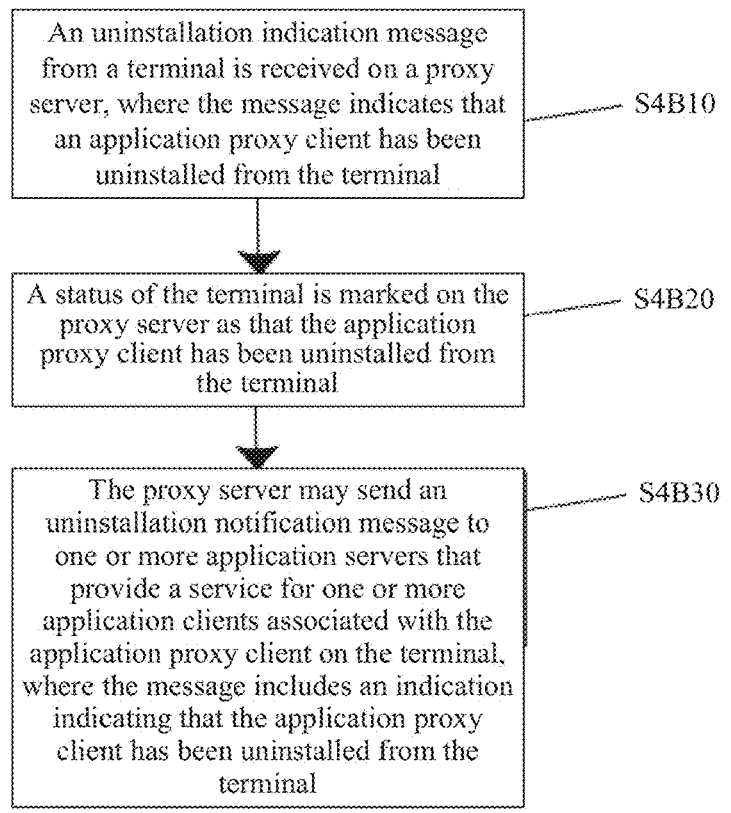
FIG. 4B is a schematic diagram of an exemplary processing procedure for learning uninstallation of AOI middleware from a terminal according to an embodiment of the present invention.

FIG. 4B shows a method for learning that an application proxy client has been uninstalled from a terminal according to an embodiment of the present invention.

As shown in FIG. 4B, in step S4B10, an uninstallation indication message is received on a proxy server from a terminal, where the message indicates that an application proxy client has been uninstalled from the terminal. The proxy server, for example, is the AOI server 120 or 220 shown in FIG. 1 or FIG. 2, or the proxy server is a Push server. The terminal for example, is the terminal 110 or 210 shown in FIG. 1 or FIG. 2, and the application proxy client, for example, is AOI middleware or a Push client.

In step S4B20, a status of the terminal is marked on the proxy server as that the application proxy client has been uninstalled from the terminal. By means of the operations in steps S4B10 and S4B20, the proxy server can timely learn an accessible status of the terminal, instead of determining, by itself only according to a specific operation of the proxy server on a network side according to an existing method, whether the application proxy client has been deleted from the terminal, thereby simplifying an operation on the network side and reducing resource consumption caused in a process in which the proxy server continually attempts to wake up the terminal from which the application proxy client has been deleted.

In step S4B30, the proxy server may send an uninstallation notification message to each application server that provides a service for the terminal, where the notification message includes an indication indicating that the application proxy client has been uninstalled from the terminal. By means of the operation in step S4B30, when receiving the uninstallation indication message sent by the terminal, the proxy server notifies the uninstallation indication to the application server, so that the application server can accurately and timely learn a status that the application proxy client has been uninstalled from the terminal and no longer sends information to the proxy server, which improves the operation on the network side.

Figure 5A:
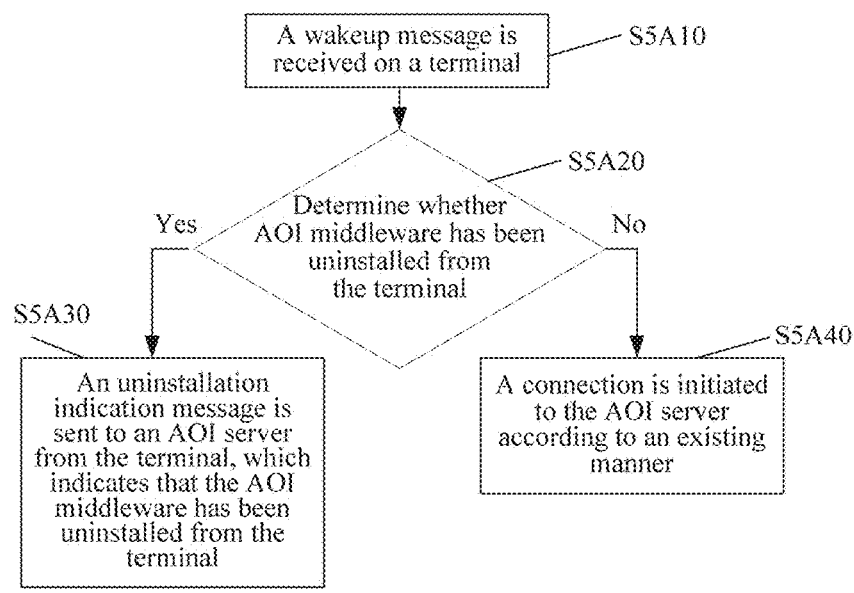
FIG. 5A and FIG. 5B are schematic diagrams of exemplary processing procedures on a terminal and an AOI server in a process for waking the terminal up by the AOI server according to embodiments of the present invention.

FIG. 5A shows a schematic diagram of a method executed by a terminal in a process in which an AOI server attempts to wake the terminal up according to an embodiment of the present invention.

In step S5A10, a wakeup message is received on a terminal from an AOI server. The wakeup message is used to indicate establishment of an IP connection between AOI middleware on the terminal and the AOI server. For example, when the AOI server needs to send a message to the terminal but finds that an IP connection between the AOI server and the terminal is broken, the AOI server sends the wakeup message to the terminal by using, for example, an SMS. For example, when the AOI server finds that the IP connection between the AOI server and the terminal is abnormal, the AOI server sends the wakeup message to the terminal by using, for example, the SMS.

In step S5A20, when the wakeup message is received, it is determined whether the AOI middleware has been uninstalled from the terminal. For example, the determining may be performed by determining whether the AOI middleware is installed on the terminal; when the AOI middleware is not installed, it is determined that the AOI middleware has been uninstalled from the terminal; and when the AOI middleware is installed, it is determined that the AOI middleware is not uninstalled from the terminal. In this example, when it is determined, in the foregoing steps S3A10, S3B10, and S3C10, that the AOI middleware is uninstalled from the terminal, as an optional manner, instead of sending an uninstallation indication message to the AOI server as soon as possible like that in the embodiments shown in FIG. 3A to FIG. 3C, whether the AOI middleware has been uninstalled from the terminal is determined after the terminal receives the wakeup message, and the uninstallation indication message is sent to the AOI server only after it is determined that the AOI middleware has been uninstalled from the terminal. Definitely, a person skilled in the art should understand that, implementation manners shown in FIG. 3A to FIG. 3B and an implementation manner shown in FIG. 5A are not mutually exclusive. They may be separately implemented as different implementation manners or may be simultaneously implemented as compatible implementation manners.

For another example, in step S5A20, the determining may be performed according to whether an indication indicating that the AOI middleware has been uninstalled from the terminal is saved on the terminal. In this example, when it is determined, in the foregoing steps S3A10, S3B10, and S3C10, that the AOI middleware is uninstalled from the terminal, the indication indicating that the AOI middleware has been uninstalled from the terminal is saved on the terminal rather than the uninstallation indication message is sent to the AOI server as soon as possible like that in the embodiments shown in FIG. 3A to FIG. 3C. After the AOI middleware is installed again afterwards on the terminal, the saved indication may be cleared. For example, a value of the indication is cleared or is set to another value indicating that the AOI middleware is not uninstalled. After the wakeup message is received in step S5A10, it is determined, according to the saved indication indicating that the AOI middleware has been uninstalled, that the AOI middleware has been uninstalled currently, and only at this time, the uninstallation indication message is sent to the AOI server in step S5A30. A benefit obtained by using the foregoing manner is that: For example, if a user uninstalls the AOI middleware and installs the AOI middleware again within a short period, the AOI server may not aware of a change of the AOI middleware on the terminal side. Therefore, in the foregoing manner, it may avoid unnecessary notifying of the indication indicating that the AOI middleware is uninstalled to the AOI server and a possible application server in this case.

In step S5A20, if it is determined that the AOI middleware has been uninstalled, in S5A30, the uninstallation indication message is sent from the terminal to the AOI server, where the message indicates that the AOI middleware has been uninstalled from the terminal. For example, the uninstallation indication message may be sent to the AOI server by using the SMS.

In step S5A20, if it is determined that the AOI middleware is not uninstalled from the terminal, in step S5A40, a connection is initiated on the terminal to the AOI server according to an existing manner.

Figure 5B:
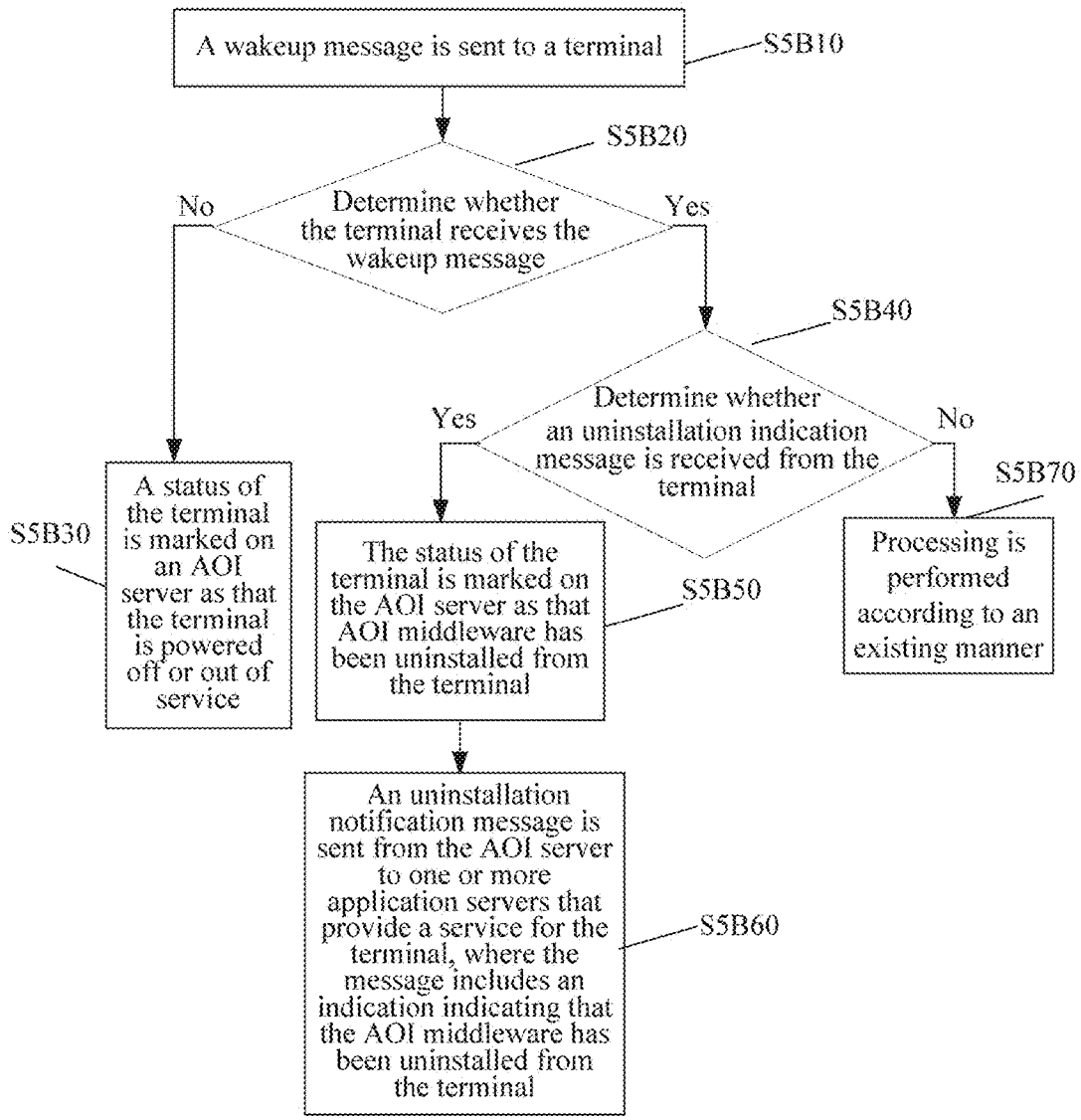

FIG. 5B shows a schematic diagram of a method implemented by an AOI server in a process in which the AOI server attempts to wake a terminal up according to an embodiment of the present invention.

In step S5B10, a wakeup message is sent from an AOI server to a terminal. The wakeup message is used to indicate establishment of an IP connection between AOI middleware on the terminal and the AOI server. The wakeup message may be sent from the AOI server to the terminal by using an SMS.

In step S5B20, on the AOI server, it is determined whether the terminal receives the wakeup message. For example, when the wakeup message is sent from the AOI server to the terminal by using the SMS, a short message receipt is sent to the AOI server if the terminal successfully receives the SMS message. Therefore, the AOI server may determine, according to whether the short message receipt from the terminal is received, whether the terminal receives the wakeup message.

When it is determined, on the AOI server, that the terminal does not receive the wakeup message, it is determined that the terminal is powered off or out of service, that is, it is determined that the terminal is inaccessible. Then, in step S5B30, a status of the terminal is marked on the AOI server as that the terminal is inaccessible.

When it is determined, on the AOI server, that the terminal receives the wakeup message, in step S5B40, whether an uninstallation indication message sent by the terminal is received is determined on the AOI server. The uninstallation indication message indicates that the AOI middleware has been uninstalled from the terminal. The uninstallation indication message may be sent from the terminal to the AOI server by using the SMS.

When it is determined, on the AOI server, that the uninstallation indication message sent by the terminal is received, in step S5B50, the status of the terminal is marked on the AOI server as that the AOI middleware has been uninstalled from the terminal.

In step S5B60, an uninstallation notification message is sent from the AOI server to one or more application servers that provide a service for one or more application clients associated with the AOI middleware on the terminal, where the message indicates that the AOI middleware has been uninstalled from the terminal.

When it is determined, on the AOI server, that the uninstallation indication message sent by the terminal is not received, in step S5B70, processing is performed on the AOI server according to an existing manner.

Figure 6A:
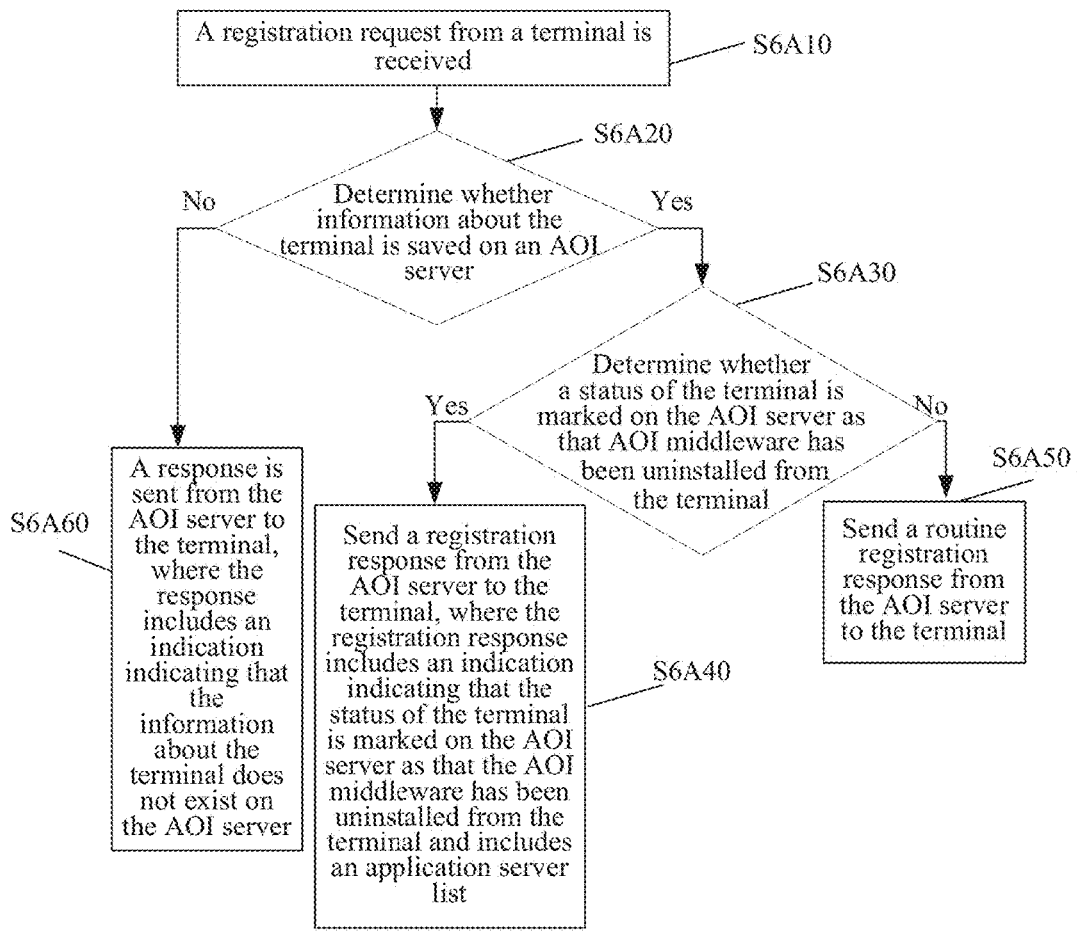
FIG. 6A and FIG. 6B are schematic diagrams of exemplary processing procedures on a terminal and an AOI server in a process for initiating a re-registration request from the terminal to the AOI server according to embodiments of the present invention.

FIG. 6A shows a schematic diagram of a method implemented by an AOI server in a process in which a terminal initiates re-registration or registration according to an embodiment of the present invention. For example, an implementation scenario of this embodiment may be as follows: Because a terminal does not have a signal for a period of time or is powered off, an AOI server marks a status of the terminal as that AOI middleware has been deleted. The AOI middleware, however, is not actually deleted from the terminal. When the terminal is online again or is powered on, the terminal initiates a re-registration request or a registration request to the AOI server.

In step S6A10, the registration request from the terminal is received on the AOI server.

In step S6A20, it is determined, according to an identifier (ID) of the terminal included in the registration request, whether information about the terminal is saved on the AOI server. For example, the identifier of the terminal is an IMSI digest. The information about the terminal includes information about establishment of a connection between the terminal and the AOI server.

In step S6A20, when it is determined that the information about the terminal is saved on the AOI server, step S6A30 is performed to determine whether the status of the terminal has been marked on the AOI server as that the AOI middleware has been uninstalled from the terminal.

In step S6A30, when it is determined that the status of the terminal has been marked on the AOI server as that the AOI middleware has been uninstalled from the terminal, step S6A40 is performed to send a registration response from the AOI server to the terminal. The registration response includes an indication indicating that the status of the terminal has been marked on the AOI server as that the AOI middleware has been uninstalled from the terminal and includes an application server list, where an application server in the list is an application server that has been notified by the AOI server that the AOI middleware has been uninstalled from the terminal. In existing procedures shown in FIG. 1 and FIG. 2, the terminal needs to register with all application servers in a registration process. In a scenario of this embodiment, however, that the AOI middleware has been uninstalled from the terminal can be learnt from the AOI server only when the application server has sent data to a UE during a period in which the terminal is offline, and an application server that has not sent data does not perceive that the status of the terminal has been marked by the AOI server as that the AOI middleware has been uninstalled, that is, the application server that has not sent data still considers that the status of the terminal is normal. In step S6A40, the indication indicating that the status of the terminal is marked on the AOI server as that the terminal has been uninstalled and the list of the application server to which the uninstalled status of the terminal has been notified, so that the terminal only needs to initiate a re-registration request or a registration request to the application server provided in the list without needing to initiate a re-registration request to another application server that does not consider that the AOI middleware has been uninstalled from the terminal, thereby reducing network resource waste.

In step S6A30, when it is determined that the status of the terminal is not marked on the AOI server as that an application proxy client has been uninstalled from the terminal, that is, when the status of the terminal is normal, step S6A50 is performed to send a routine registration response from the AOI server to the terminal. In this case, the UE may not need to re-register with the application server.

In step S6A20, when it is determined that the information about the terminal is not saved on the AOI server, a reply message is sent from the AOI server to the terminal, where the reply message includes an indication indicating that the information about the terminal does not exist on the AOI server.

Figure 6B:
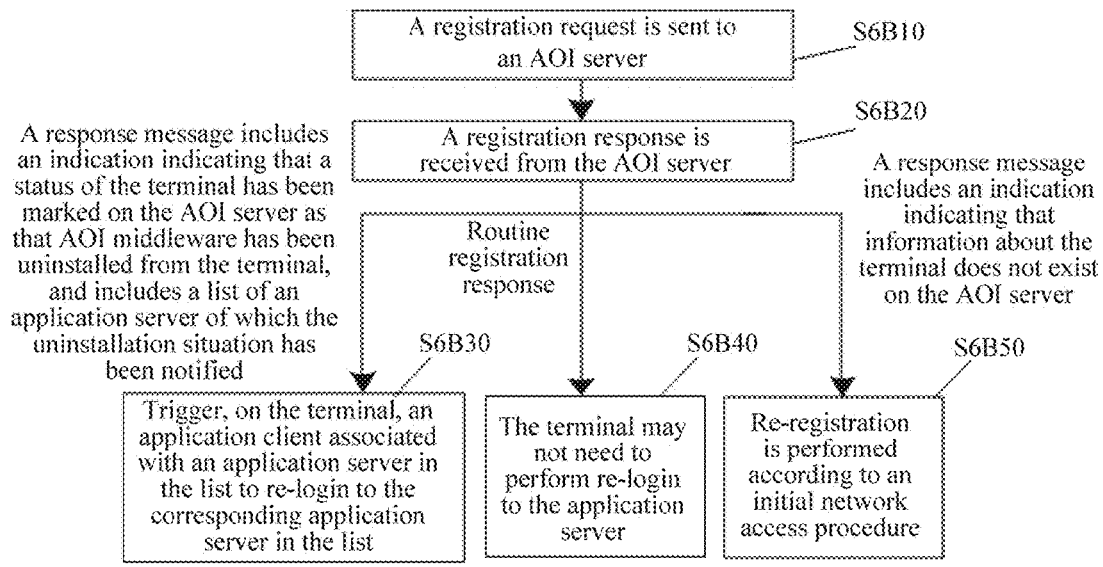

FIG. 6B shows a schematic diagram of a method implemented by a terminal in a process in which the terminal initiates re-registration or registration according to an embodiment of the present invention. For example, an implementation scenario of this embodiment may be as follows: Because a terminal does not have a signal for a period of time or is powered off, an AOI server marks a status of the terminal as that AOI middleware has been deleted. The AOI middleware, however, is not actually deleted from the terminal. When the terminal is online again or is powered on, the terminal initiates a re-registration request or a registration request to the AOI server.

In step S6B10, the registration request is sent from the terminal to the AOI server.

In step S6B20, a registration response is received on the terminal from the AOI server.

In one case, the registration response includes an indication indicating that the status of the terminal has been marked on the AOI server as that the AOI middleware has been uninstalled from the terminal, and the registration response further includes an application server list, where an application server in the list is an application server that has been notified by the AOI server that the AOI middleware has been uninstalled from the terminal. In this case, step S6B30 is performed to trigger, on the terminal, an application client associated with an application server in the list to re-login or re-register with the corresponding application server in the list. According to an embodiment, an application client on the terminal sends a re-registration request to an application server that provides a service for the application client. The re-registration request includes a Token allocated by the AOI server to the application client, where the Token is used to indicate that the application server communicates with the application client on the terminal through the AOI server. In step S6B30, the terminal initiates the re-registration request only to the application server in the list without needing to initiate a re-registration request to another application server that does not consider that the AOI middleware has been uninstalled from the terminal. Compared with an existing re-registration procedure in which the terminal needs to re-register with all application servers, network resource waste is reduced.

In another case, the response message is a routine registration response from the AOI server. In this case, the terminal may not need to send a re-registration request to the application server again. It should be noted that, actually, step S6B40 is not performed on the terminal. This step is shown in FIG. 6B only for the purpose of convenient description.

In another case, the response message includes an indication indicating that information about the terminal does not exist on the AOI server. In this case, step S6B50 is performed to perform a re-registration process on the terminal according to an initial network access procedure and the indication. For example, the re-registration is performed according to the procedure shown in FIG. 2.

Figure 7:
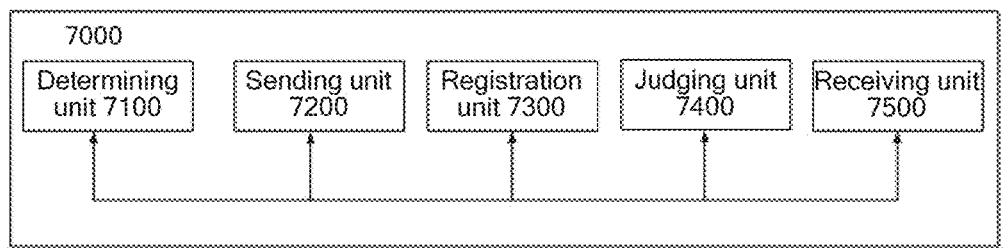
FIG. 7 is a schematic block diagram of a terminal according to an embodiment of the present invention.

FIG. 7 shows a communications apparatus 7000 according to an embodiment of the present invention. The apparatus may be a terminal, for example, the terminal 110 or 210 in FIG. 1 or FIG. 2, or may be a component implemented on the terminal; and the component may be a software module implemented by using a program, may be a hardware module implemented in a hardware manner, or may be a functional module implemented by using various implementation manners well-known by a person skilled in the art.

According to one aspect, the apparatus 7000 is a processing apparatus 7000 for an application proxy client.

According to an embodiment, the apparatus 7000 includes a determining unit 7100 and a sending unit 7200. The determining unit 7100 is configured to determine, on the terminal, that AOI middleware is uninstalled. The sending unit 7200 is configured to send an uninstallation indication message from the terminal to an AOI server corresponding to the AOI middleware, where the message indicates that the AOI middleware has been uninstalled from the terminal.

According to another embodiment, the apparatus 7000 further includes a registration unit 7300, configured to: when the terminal has an IP bearer, trigger one or more application clients associated with the AOI middleware to initiate a registration request to one or more application servers over the IP bearer. For example, the registration request does not carry a Token allocated by the AOI server to the foregoing one or more application clients. The Token is used to indicate that the one or more application servers communicate with the terminal or the one or more application clients of the terminal through the AOI server. When this Token is not carried, the one or more application servers may learn that communication is performed with the one or more application clients of the terminal without using the AOI server.

According to another embodiment, the apparatus 7000 further includes a receiving unit 7500, configured to receive, on the terminal, a wakeup message from a proxy server. After the receiving unit 7500 receives the wakeup message, the determining unit 7100 determines, on the terminal, that the application proxy client has been uninstalled.

According to another embodiment, the apparatus 7000 further includes a judging unit 7400, configured to determine whether the terminal has an IP bearer when the AOI middleware is uninstalled. If the judging unit 7400 determines that the terminal has the IP bearer when the AOI middleware is uninstalled, the sending unit 7200 sends an uninstallation indication message to the AOI server over the IP bearer; and if the judging unit 7400 determines that the terminal has no IP bearer when the AOI middleware is uninstalled, the sending unit 7200 performs one of the following operations: saving, on the terminal, an indication indicating that the AOI middleware has been uninstalled from the terminal, and sending the uninstallation indication message to the AOI server over the IP bearer when the terminal has the IP bearer; or sending the uninstallation indication message to the AOI server by using an SMS.

According to another embodiment, the apparatus 7000 includes a determining unit 7100, a judging unit 7400, a sending unit 7200, and a registration unit 7300. The determining unit 7100 is configured to determine, on the terminal, that the AOI middleware is uninstalled; the judging unit 7400 is configured to determine whether the terminal has an IP bearer when the AOI middleware is uninstalled; if the judging unit 7400 determines that the terminal has the IP bearer when the AOI middleware is uninstalled, the sending unit 7200 sends an uninstallation indication message to the AOI server over the IP bearer, where the message indicates that the AOI middleware has been uninstalled from the terminal, and the registration unit 7300 triggers one or more application clients associated with the AOI middleware to initiate a registration request to corresponding one or more application servers, where the registration request does not carry a Token allocated by the AOI server to the foregoing one or more application clients; and if the judging unit 7400 determines that the terminal has no IP bearer when the AOI middleware is uninstalled, the sending unit 7200 sends an uninstallation indication message to one or more application clients associated with the AOI middleware, where the uninstallation indication message includes an indication indicating that the AOI middleware has been uninstalled from the terminal, and when the terminal has an IP bearer, the registration unit 7300 triggers the one or more application clients associated with the AOI middleware to send the registration request to the corresponding one or more application servers, where the registration request does not carry the Token allocated by the AOI server to the foregoing one or more application clients.

According to another aspect, the apparatus 7000 may be an apparatus 7000 for waking a terminal up. According to an embodiment, the apparatus 7000 includes a receiving unit 7500, a judging unit 7400, and a sending unit 7200. The receiving unit 7500 is configured to receive, on the terminal, a wakeup message from the AOI server. The wakeup message is used to indicate establishment of an IP connection between AOI middleware on the terminal and the AOI server; the judging unit 7400 is configured to, after the receiving unit 7500 receives the wakeup message, determine whether the AOI middleware has been uninstalled from the terminal; and the sending unit 7500 is configured to send an uninstallation indication message from the terminal to the AOI server when the judging unit 7400 determines that the AOI middleware has been uninstalled from the terminal, where the message indicates that the AOI middleware has been uninstalled from the terminal.

According to another aspect, the apparatus 7000 may be a re-registration apparatus for a terminal. According to an embodiment, the apparatus 7000 includes a registration unit 7300 and a receiving unit 7500. The registration unit 7300 is configured to send a registration request from a terminal to an AOI server; the receiving unit 7500 is configured to receive, on the terminal, a registration response from the AOI server, where the registration response includes an uninstallation indication and an application server list, the uninstallation indication is used to indicate that a status of the terminal is marked on the AOI server as that AOI middleware has been uninstalled from the terminal, and an application server in the list is an application server that has been notified by the AOI server that the AOI middleware has been uninstalled from the terminal; and the registration unit 7300 triggers, on the terminal, an application client associated with an application server in the list to register with the corresponding application server in the list.

According to another embodiment, the registration 7300 triggers, on the terminal, an application client to send a registration request to a corresponding application server in the list, where the registration request includes a Token allocated by the AOI server to the application client, and this Token is used to indicate that the application server communicates with the terminal or the application client on the terminal through the AOI server.

The apparatus in the embodiment shown in FIG. 7 and units included in the apparatus can perform corresponding steps in the method embodiments shown in FIG. 4A, FIG. 3A to FIG. 3C, FIG. 5A, and FIG. 6B, which are not further described herein.

It should be noted that, although the apparatus 7000 described in FIG. 7 includes a plurality of units, that is, 7100 to 7500, to implement the present invention, the apparatus 7000 may only need to include a part of units thereof in different embodiments, and it is unnecessary to include all illustrated units.

Figure 8:
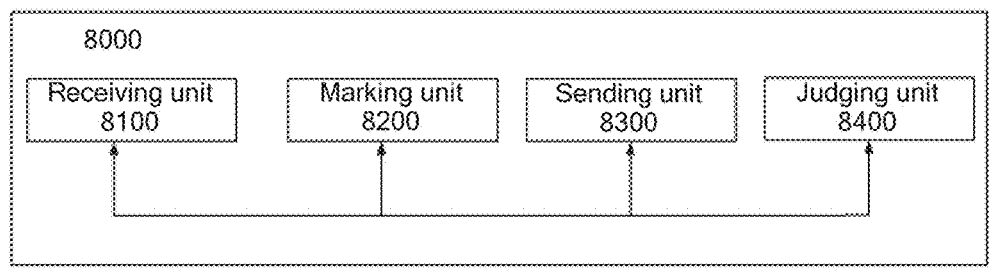
FIG. 8 is a schematic block diagram of an AOI server according to an embodiment of the present invention.

FIG. 8 shows a communications apparatus 8000 according to an embodiment of the present invention. The apparatus may be an AOI server, for example, the AOI server 120 or 220 in FIG. 1 or FIG. 2, or may be a component implemented on the AOI server; and the component may be a software module implemented by using a program, may be a hardware module implemented in a hardware manner, or may be a functional module implemented by using various implementation manners well-known by a person skilled in the art.

According to one aspect, the apparatus 8000 is an apparatus 8000 for learning that AOI middleware has been uninstalled from a terminal.

According to an embodiment, the apparatus 8000 includes a receiving unit 8100 and a marking unit 8200. The receiving unit 8100 is configured to receive, on an AOI server, an uninstallation indication message from a terminal, where the message indicates that AOI middleware has been uninstalled from the terminal. The marking unit 8200 is configured to mark, according to the uninstallation indication message received by the receiving unit 8100, a status of the terminal on the AOI server as that the AOI middleware has been uninstalled from the terminal.

According to an embodiment, the apparatus 800 further includes a sending unit 8300, configured to send an uninstallation notification message from the AOI server to one or more application servers that provide a service for one or more application clients associated with the AOI middleware on the terminal, where the message indicates that the AOI middleware has been uninstalled from the terminal.

According to an embodiment, the sending unit 8300 is further configured to send a wakeup message from the AOI server to the terminal. The wakeup message is used to indicate establishment of an IP connection between the AOI middleware on the terminal and the AOI server. The receiving unit 8100 is further configured to receive, on the AOI server, an uninstallation indication message from the terminal in response to the wakeup message.

According to another aspect, the apparatus 8000 is an apparatus for waking a terminal up. According to an embodiment, the apparatus 8000 includes a sending unit 8300, a judging unit 8400, and a marking unit 8200. The sending unit 8300 is configured to send a wakeup message from an AOI server to the terminal, where the wakeup message is used to indicate establishment of an IP connection between AOI middleware on the terminal and the AOI server; the judging unit 8400 is configured to determine, on the AOI server, whether the terminal receives the wakeup message; the marking unit 8200 is configured to: when it is determined that the terminal does not receive the wakeup message, mark a status of the terminal on the AOI server as inaccessible; when it is determined that the terminal receives the wakeup message, the judging unit 8400 determines whether an uninstallation indication message sent by the terminal is received, where the uninstallation indication message indicates that the AOI middleware has been uninstalled from the terminal; and when it is determined that the uninstallation indication message sent by the terminal is received, the marking unit 8200 marks the status of the terminal on the AOI server as that the AOI middleware has been uninstalled from the terminal.

According to another embodiment, the sending unit 8300 may further be configured to send an uninstallation notification message from the AOI server to one or more application servers that provide a service for one or more application clients associated with the AOI middleware on the terminal, where the message indicates that the AOI middleware has been uninstalled from the terminal.

According to another aspect, the apparatus 8000 is a re-registration apparatus for a terminal. According to an embodiment, the apparatus 8000 includes a receiving unit 8100, a judging unit 8400, and a sending unit 8300. The receiving unit 8100 is configured to receive, on an AOI server, a registration request from a terminal; the judging unit 8400 is configured to determine, according to an identifier (ID) of the terminal included in the registration request, whether information about the terminal is saved on the AOI server, and if it is determined that the information about the terminal is saved on the AOI server, determine whether a status of the terminal has been marked on the AOI server as that AOI middleware has been uninstalled from the terminal; and the sending unit 8300 is configured to send a registration response from the AOI server to the terminal if the judging unit 8400 determines that the status of the terminal is marked on the AOI server as that the AOI middleware has been uninstalled from the terminal. The registration response includes an indication indicating that the status of the terminal is marked on the AOI server as that the AOI middleware has been uninstalled from the terminal and includes an application server list, where an application server in the list is an application server that has been notified by the AOI server that the AOI middleware has been uninstalled from the terminal.

According to another embodiment, the sending unit 8300 is further configured to: when it is determined that the information about the terminal is not saved on the AOI server, send a reply message from the AOI server to the terminal, where the replay message includes an indication indicating that the information about the terminal does not exist on the AOI server.

The apparatus in the embodiment shown in FIG. 8 and units included in the apparatus can perform corresponding steps in the method embodiments shown in FIG. 4B, FIG. 5B, and FIG. 6A, which are not further described herein.

It should be noted that, although the apparatus 8000 described in FIG. 8 includes a plurality of units, that is, 8100 to 8400, to implement the present invention, the apparatus 8000 may only need to include a part of units thereof in different embodiments, and it is unnecessary to include all illustrated units.

The units shown in FIG. 7 and FIG. 8 may include a processor, an electronic device, a hardware device, an electronic component, a logical circuit, a memory, or any combination thereof, and the like, or may be implemented by using the foregoing devices. A person skilled in the art should understand that, the units shown in FIG. 7 and FIG. 8 can perform a corresponding processing process of the foregoing method described with reference to FIG. 3A to FIG. 6B.

Figure 9:
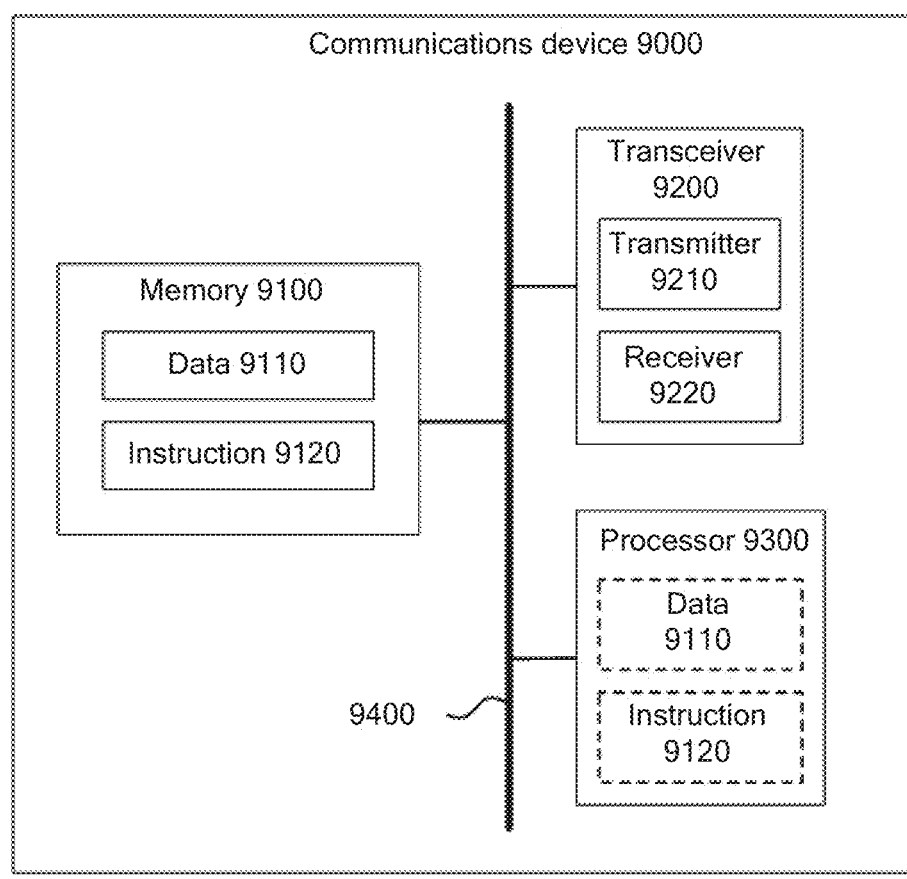
FIG. 9 is a schematic diagram of an exemplary communications device applicable to an implementation manner of the present invention.

FIG. 9 shows a communications device 9000 according to an embodiment of the present invention. The communications device may be a terminal or a proxy server applicable to the present invention, and the proxy server may be, for example, an AOI server or a Push server.

The communications device 9000 includes various components connected by using a bus 9400, for example, a processor 9300, a memory 9100, and a transceiver 9200. The memory 9100 may store data 9110 and an instruction 9120. The processor 9300 can implement the apparatus disclosed in the present invention by executing the instruction 9120 and using the data 9110. The transceiver 9200 includes a transmitter 9210 and a receiver 9220 to allow signal sending and receiving between the communications device and another communications device.

According to an embodiment, the communications device shown in FIG. 9 may be a terminal, and includes a processor 9300 and a memory 9100 connected to the processor. The processor is configured as follows: on the terminal, determining that an application proxy client is uninstalled; and sending an uninstallation indication message from the terminal to a proxy server corresponding to the application proxy client, where the message indicates that the application proxy client has been uninstalled from the terminal.

A person skilled in the art should understand that, the processor may further be configured to perform the foregoing operations in each embodiment described with reference to FIG. 3A to FIG. 3C, FIG. 4A, FIG. 5A, and FIG. 6B.

According to an embodiment, the communications device shown in FIG. 9 may be a proxy server, and includes a processor 9300 and a memory 9100 connected to the processor. The processor is configured as follows: receiving, on a proxy server, an uninstallation indication message from a terminal, where the message indicates that an application proxy client has been uninstalled from the terminal; and marking a status of the terminal on the proxy server as that the application proxy client has been uninstalled from the terminal. A person skilled in the art should understand that, the processor may further be configured to perform the foregoing operations in each embodiment described with reference to FIG. 4B, FIG. 5B, and FIG. 6A.

A person skilled in the art should understand that, in a wireless communications device shown in FIG. 9, a program stored in the memory 9100 is performed by using the processor 9300, which can perform the foregoing procedures described with reference to FIG. 3A to FIG. 6B and the corresponding processing procedures in the apparatuses described with reference to FIG. 7 and FIG. 8.

The embodiments of the present invention may further be implemented in the form of a computer program. When being executed, the computer program can implement the procedures of the foregoing methods described with reference to FIG. 3A to FIG. 6B.

The embodiments of the present invention may further be implemented in the form of a machine-readable medium that stores an executable instruction. When the executable instruction is executed, the machine implements the procedures of the foregoing methods described with reference to FIG. 3A to FIG. 6B.

The steps of the apparatuses described in this specification may be directly embodied as hardware, software executed by a processor, or a combination of the two. The software may be stored in a storage medium. The technical solutions of the present invention essentially, or a part contributing to the prior art, or all or a part of the technical solutions may be implemented in the form of a software product. The computer software product is stored in a storage medium and includes several instructions for instructing a computer device (which may be a personal computer, a server, or a network device, or the like) to perform all or a part of the steps of the apparatuses described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc. The technical solutions of the present invention essentially, or the part contributing to the prior art, or all or a part of the technical solutions may be implemented in the form of a hardware product, for example, the technical solutions of the present invention are implemented as a dedicated hardware module by using technologies that are well-known in the field, such as an application specific integrated circuit (ASIC, Application Specific Integrated Circuit), a field programmable gate array (FPGA, Field Programmable Gate Array), and a complex programmable logic device (CPLD, Complex Programmable Logic Device).

It should be noted that in the foregoing terminal and server embodiments, the included units are only divided according to functional logic, but are not limited to the foregoing division, as long as corresponding functions can be implemented; in addition, a specific name of each functional unit is only for facilitating distinguishment from each other, and is not intended to limit the protection scope of the present invention.

The descriptions of the specific embodiments of the present invention are provided in the foregoing to enable a person skilled in the art to implement or use the present invention. However, various modifications made to the embodiments of the present invention complying with the general principle of the present invention shall also fall within the protection scope of the present invention.

What is claimed is:

1. A processing method for an application proxy client, the method comprising:
   uninstalling, on a terminal, an application proxy client from the terminal, wherein the terminal is a client computer, wherein the application proxy client is used by the terminal to communicate with an application server through a proxy server located at a network side of an Internet communications network;
   determining, by the terminal, that the application proxy client is uninstalled from the terminal; and
   in response to determining the application proxy client is uninstalled from the terminal, sending an uninstallation indication message from the terminal to the proxy server corresponding to the application proxy client, wherein the uninstallation indication message indicates that the application proxy client has been uninstalled from the terminal;
   after sending the uninstallation message to the proxy server, triggering, on the terminal, one or more application clients on the terminal to initiate a registration request corresponding to one or more application servers over an Internet Protocol (IP) bearer, wherein the one or more application clients are associated with the application proxy client;

receiving a response to the registration request, the response enabling the one or more application clients to communicate with the one or more application servers; and communicating from the terminal to the one or more application servers by the one or more application clients.

2. The method according to claim 1, wherein the registration request does not carry a token allocated by the proxy server to each of the one or more application clients, and wherein absence of the token indicates that the one or more application servers communicate with the terminal without using the proxy server.

3. The method according to claim 1, further comprising receiving, by the terminal, a wakeup message from the proxy server, wherein determining that the application proxy client is uninstalled comprises, in response to receiving the wakeup message, determining, by the terminal, that the application proxy client has been uninstalled.

4. The method according to claim 1, further comprising:
in response to determining that the application proxy client is uninstalled, saving an indication on the terminal indicating that the application proxy client has been uninstalled from the terminal; and
receiving, by the terminal, a wakeup message from the proxy server;
wherein sending the uninstallation indication message from the terminal to a proxy server corresponding to the application proxy client comprises, in response to receiving the wakeup message by the terminal from the proxy server, sending, according to the saved indication indicating that the application proxy client has been uninstalled from the terminal, the uninstallation indication message from the terminal to the proxy server corresponding to the application proxy client.

5. The method according to claim 1, wherein sending the uninstallation indication message from the terminal to a proxy server corresponding to the application proxy client comprises:
when the terminal has an IP bearer when the application proxy client is uninstalled, sending the uninstallation indication message to the proxy server over the IP bearer; and
when the terminal does not have an IP bearer when the application proxy client is uninstalled, saving, on the terminal, the indication indicating that the application proxy client has been uninstalled from the terminal.

6. The method according to claim 1, wherein sending the uninstallation indication message from the terminal to a proxy server corresponding to the application proxy client comprises:
when the terminal has no IP bearer when the application proxy client is uninstalled, saving, on the terminal, the indication indicating that the application proxy client has been uninstalled from the terminal; and
when the terminal has an IP bearer, sending the uninstallation indication message to the proxy server over the IP bearer.

7. A non-transitory computer program product, comprising an executable instruction of a computer, wherein the instruction, when being executed by the computer, is used to implement the method according to claim 1.

8. A method for learning that an application proxy client has been uninstalled from a terminal, the method comprising:
receiving, by a proxy server, an uninstallation indication message from the terminal, wherein the uninstallation indication message indicates that the application proxy client has been uninstalled from the terminal, wherein the proxy server is located at a network side of an Internet communications network, wherein the terminal is located at a terminal side of the Internet communications network;
in response to receiving the uninstallation indication message, marking, according to the uninstallation indication message, a status of the terminal on the proxy server to indicate that the application proxy client has been uninstalled from the terminal; and
in response to receiving the uninstallation indication message, sending, according to the uninstallation indication message, an uninstallation notification message from the proxy server to one or more application servers, wherein the one or more application servers are servers that provide a service for one or more application clients on the terminal, and wherein the one or more application clients are associated with the application proxy client uninstalled from the mobile device.

9. The method according to claim 8, further comprising sending a wakeup message from the proxy server to the terminal, wherein receiving the uninstallation indication message from the terminal comprises receiving the uninstallation indication message from the terminal in response to the wakeup message.

10. The method according to claim 8, wherein the proxy server is configured to receive the uninstallation indication message from the terminal via a short message service SMS.

11. A method for waking a terminal, the method comprising:
sending a wakeup message from a proxy server to the terminal, wherein the proxy server is located at a network side of an Internet communications network, wherein the terminal is located at a terminal side of the Internet communications network;
determining, by the proxy server, whether the terminal receives the wakeup message;
determining, by the proxy server, that an uninstallation indication message sent by the terminal is received by the proxy server, wherein the uninstallation indication message comprises an indication indicating that an application proxy client has been uninstalled from the terminal;
marking the status of the terminal on the proxy server as that the application proxy client has been uninstalled from the terminal; and
in response to having received the uninstallation indication message from the terminal, sending an uninstallation notification message from the proxy server to an application server, wherein the application server corresponds to a server that the proxy server is configured to provide communications between the application proxy client on the terminal and the application server.

12. A re-registration method for a terminal, the method comprising:
receiving, by a proxy server located at a network side of an Internet communications network, a registration request from the terminal, the terminal being located at a terminal side of the Internet communications network;
determining in response to the registration request, according to an identifier ID of the terminal comprised in the registration request, that information about the terminal is saved on the proxy server;
determining in the saved information about the terminal that a status of the terminal has been marked on the proxy server as that an application proxy client has been uninstalled from the terminal;

notifying an application server that the application proxy client has been uninstalled from the terminal, wherein the application server corresponds to a server communicated to by application proxy client via the proxy server; and in response to determining that the status of the terminal has been marked on the proxy server, sending a registration response from the proxy server to the terminal, wherein the registration response comprises an uninstallation indication and an application server list, wherein the uninstallation indication is used to indicate that the status of the terminal has been marked on the proxy server as that the application proxy client has been uninstalled from the terminal, and the application server list includes the application server that has been notified by the proxy server that the application proxy client has been uninstalled from the terminal.

13. The method according to claim 12, further comprising, receiving, by the proxy server, a first registration request from a first terminal;

determining, according to a first identifier ID of the first terminal of the first registration request, that information about the terminal is not saved on the proxy server; and sending a reply message from the proxy server to the first terminal, wherein the reply message comprises an indication indicating that the information about the first terminal does not exist on the proxy server.

14. A re-registration method for a terminal, the method comprising:

after uninstalling an application proxy client from the terminal, sending a registration request from the terminal to a proxy server, wherein the terminal is a client computer at a terminal side of an Internet communications network and the proxy server is at a network side of the Internet communications network;

receiving, by the terminal, a registration response from the proxy server in response to the registration request, wherein the registration response comprises an uninstallation indication and an application server list, wherein the uninstallation indication indicates to the terminal that a status of the terminal has been marked on the proxy server as that an application proxy client has been uninstalled from the terminal, and the application server list includes an application server that has been notified by the proxy server that the application proxy client has been uninstalled from the terminal; and triggering, on the terminal, an application client associated with an application server in the list to register with a corresponding application server in the list.

15. The method according to claim 14, wherein triggering the application client associated with the application server in the list to register with the corresponding application server in the list comprises sending, by the application client, an application registration request to the corresponding application server, wherein the application registration request comprises a token allocated by the proxy server to the application client, and the token is used to indicate that the application server communicates with the application client on the terminal through the proxy server.

16. A terminal comprising:
a processor;
a computer-readable storage medium storing a program to be executed by the processor, the program including instructions for:
uninstalling an application proxy client from the terminal, wherein the terminal is a client computer at a terminal side of an Internet communications network and the proxy server is at a network side of the Internet communications network,
determining that the application proxy client is uninstalled from the terminal,
sending an uninstallation indication message in response to determining that the application proxy client is uninstalled, the uninstallation indication message sent from the terminal to a proxy server corresponding to the application proxy client, wherein the uninstallation indication message indicates that the application proxy client has been uninstalled from the terminal,
after sending the uninstallation message to the proxy server, triggering, by the terminal, one or more application clients on the terminal to initiate a registration request corresponding to an application client on the terminal over an Internet Protocol (IP) bearer, wherein the one or more application clients are associated with the application proxy client, and
in response to the registration request, registering the one or more application clients to communicate with the one or more application servers; and
a transmitter, configured to send the uninstallation indication message and the registration request.

17. The terminal according to claim 16, wherein the registration request does not carry a token allocated by the proxy server to each of the one or more application clients, and wherein absence of the token indicates that the one or more application servers communicate with the one or more application clients of the terminal through the proxy server.

18. The terminal according to claim 16, further comprising a receiver to receive a wakeup message from the proxy server, wherein the processor is programmed to, in response to the receiver receiving the wakeup message, determine that the application proxy client has been uninstalled.

19. The terminal according to claim 16, wherein the processor is programmed to, after determining that the application proxy client is uninstalled, save an indication indicating that the application proxy client has been uninstalled from the terminal; and
wherein the terminal further comprises a receiver, configured to receive, by the terminal, a wakeup message from the proxy server, wherein the transmitter is configured to, in response to receiving the wakeup message by the terminal from the proxy server, send the uninstallation indication message from the terminal to the proxy server corresponding to the application proxy client, according to the saved indication indicating that the application proxy client has been uninstalled from the terminal.

20. The terminal according to claim 16, wherein the processor is further configured to determine whether the terminal has an IP bearer when the application proxy client is uninstalled, wherein the transmitter is configured to send the uninstallation indication message to the proxy server over the IP bearer when it is determined that the terminal has an IP bearer when the application proxy client is uninstalled.

21. The terminal according to claim 16, wherein the processor is further programmed to determine whether the terminal has an IP bearer when the application proxy client is uninstalled, wherein the transmitter is configured to send the uninstallation indication message to the proxy server by using a short message service SMS, or to save, on the terminal, the indication indicating that the application proxy client has been uninstalled from the terminal in a case in which it is determined that the terminal has no IP bearer when the application proxy client is uninstalled, and when the terminal has an IP bearer, send the uninstallation indication message to the proxy server over the IP bearer.

22. A proxy server comprising:
   a receiver, configured to receive, by a proxy server, an uninstallation indication message from a terminal, wherein the uninstallation indication message indicates that an application proxy client has been uninstalled from the terminal, wherein the proxy server is located at a network side of an Internet communications network, wherein the terminal is located at a terminal side of the Internet communications network;
   a processor coupled to a memory and programmed to mark in response to receiving the uninstallation indication message, according to the uninstallation indication message received by the receiver, a status of the terminal on the proxy server as that the application proxy client has been uninstalled from the terminal; and
   a transmitter, configured to send, according to the uninstallation indication message, an uninstallation notification message from the proxy server to one or more application servers, wherein the one or more application servers are servers that provide a service for one or more application clients, the one or more application clients are associated with the application proxy client on the terminal, and the uninstallation notification message indicates that the application proxy client has been uninstalled from the terminal.

23. The proxy server according to claim 22, wherein the transmitter is further configured to send a wakeup message from the proxy server to the terminal and the receiver configured to receive the uninstallation indication message from the terminal in response to the wakeup message.

24. The proxy server according to claim 22, wherein the receiver is configured to receive the uninstallation indication message from the terminal by using a short message service SMS.

25. The proxy server according to claim 22, wherein the receiver is configured to receive the uninstallation indication message from the terminal over an Internet Protocol IP bearer.

26. A terminal, comprising:
   a processor;
   a computer-readable storage medium storing a program to be executed by the processor, the program including instructions to send, after uninstalling an application proxy client from the terminal, a registration request from the terminal to a proxy server, wherein the terminal is a client computer located at a terminal side of an Internet communications network, and wherein the proxy server is located at a network side of an Internet communications network; and
   a receiver, configured to receive a registration response from the proxy server in response to the registration request, wherein the registration response comprises an uninstallation indication and an application server list, wherein the uninstallation indication indicates that a status of the terminal has been marked on the proxy server as that an application proxy client has been uninstalled from the terminal, and the application server list includes an application server that has been notified by the proxy server that the application proxy client has been uninstalled from the terminal; and
   wherein the program further includes instructions to trigger an application client associated with an application server in the list to register with a corresponding application server in the list.

27. The terminal according to claim 26, wherein the processor is programmed to trigger the application client to send an application registration request to the corresponding application server in the list, wherein the application registration request comprises a token allocated by the proxy server to the application client, and the token is used to indicate that the application server communicates with the application client on the terminal through the proxy server.

* * * * *